(12) United States Patent
Shah et al.

(10) Patent No.: US 7,139,965 B2
(45) Date of Patent: Nov. 21, 2006

(54) BUS DEVICE THAT CONCURRENTLY SYNCHRONIZES SOURCE SYNCHRONOUS DATA WHILE PERFORMING ERROR DETECTION AND CORRECTION

(75) Inventors: Paras A. Shah, Houston, TX (US); Prashantha Kalluraya, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 10/680,884

(22) Filed: Oct. 8, 2003

(65) Prior Publication Data

US 2005/0081129 A1    Apr. 14, 2005

(51) Int. Cl.
*H03M 13/00* (2006.01)
(52) U.S. Cl. ...................... 714/775; 714/701
(58) Field of Classification Search ................ 714/775, 714/701
See application file for complete search history.

(56) References Cited

U.S. PATENT DOCUMENTS 3,550,082 A * 12/1970 Tong .......................... 714/775
6,829,715 B1 * 12/2004 Chiao et al. ................ 713/401
6,915,446 B1 * 7/2005 Riley ............................ 714/5

* cited by examiner

*Primary Examiner*—Guy J. Lamarre

(57) ABSTRACT

A bus device comprises a clock generator that is adapted to generate a clock signal for internal use by the bus device, data synchronizing logic that is adapted to synchronize source synchronous data that the bus device receives from the bus to the bus device's clock signal, and error detection and correction logic coupled to the data synchronizing logic. The error detection and correction logic is adapted to detect and correct errors associated with the data received from the bus concurrently while the data synchronizing logic synchronizes source synchronous data received from the bus to the clock signal.

19 Claims, 3 Drawing Sheets

BUS DEVICE THAT CONCURRENTLY SYNCHRONIZES SOURCE SYNCHRONOUS DATA WHILE PERFORMING ERROR DETECTION AND CORRECTION

BACKGROUND

In many types of electronic systems, electronic components within the system may be capable of transmitting digital data to and receiving digital data from other components. For example, one device coupled to a bus may transmit data to another device on the bus. The data may be transferred in a series of data "phases" or "packets." A finite amount of time is generally required for a data packet to be transferred from a source device to a destination device. Such time may be referred to as latency. Electronic system designers generally try to reduce the amount of latency in a system.

For various reasons, one or more of the bits comprising the data transmission may be received incorrectly. That is, a logic "0" may be received as a logic "1," and vice versa. Such errors may have a detrimental effect on the operation of the system. Error detection and correction logic may be included but undesirably may add to the latency associated with data transfers in the system. It is thus desirable to implement an error detection and correction scheme and, in particular, an error detection and correction scheme that avoids or at least reduces the amount of added latency in the system.

BRIEF SUMMARY

In some embodiments, a bus device comprises a clock generator that is adapted to generate a clock signal for internal use by the bus device, data synchronizing logic that is adapted to synchronize source synchronous data that the bus device receives from the bus to the bus device's clock signal, and error detection and correction logic coupled to the data synchronizing logic. The error detection and correction logic is adapted to detect and correct errors associated with the data received from the bus concurrently while the data synchronizing logic synchronizes source synchronous data received from the bus to the clock signal.

BRIEF DESCRIPTION OF THE DRAWINGS

For a detailed description of some embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
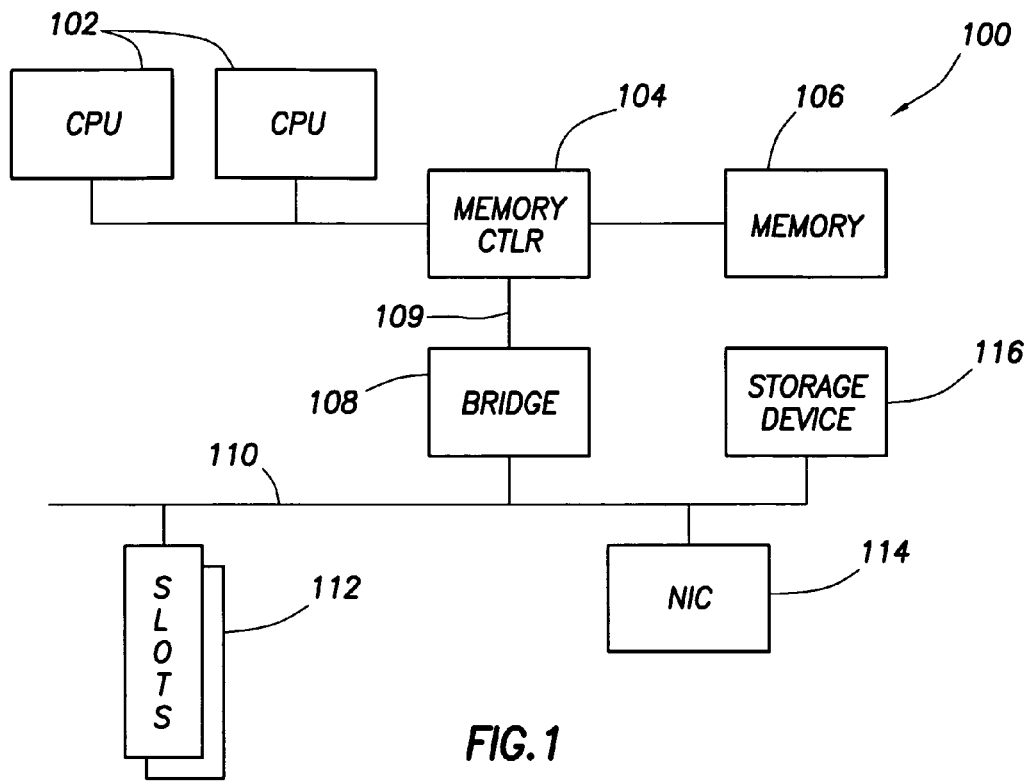
FIG. 1 shows a block diagram of a system in accordance with exemplary embodiments of the invention.

Referring to FIG. 1, a system 100 is shown in accordance with exemplary embodiments of the invention. System 100 may be representative of a wide variety of electronic systems such as a computer. As shown, the system 100 may comprise one or more central processing units ("CPUs") 102, a memory controller 104, memory 106, a bridge 108, and one or more other devices such as a network interface controller ("NIC") 114 and a storage device 116. The NIC 114 may provide the system 100 with connectivity to an external network. The storage device 116 may comprise non-volatile storage such as a hard disk drive or CD ROM drive. One or more slots 112 also may be provided into which add-in cards can be installed for inclusion in the system 100.

The memory controller 104 couples to the CPUs 102, memory 106 and bridge 108. The memory controller 104 generally functions to permit the various devices in the system to have access to memory 106 in a controlled manner. The memory 106 may comprise volatile memory such as any suitable type of random access memory ("RAM").

The bridge 108 generally bridges together busses 109 (from the memory controller 104) and 110, thereby permitting devices 114 and 116 and add-in cards (if any) in slots 112 to write data to or read data from memory. Further, the bridge permits the CPUs 102 to communicate with the devices coupled to bus 110.

Bus 110 may be implemented according to any of a variety of applicable protocols. In general, bus 110 may implement a protocol (e.g., PCI-X 2.0) that provides for both "common clock" and "source synchronous data." Common clock refers to the sharing of a common clock signal among multiple devices in a system. Each such device uses the shared clock signal to receive and transmit data. As clock frequencies have increased over the years, the length of individual traces carrying such clock signals between devices has become significant in terms of introducing undesirable phase shifts, skew and latency for a common clock. To remedy this problem, source synchronous data may be provided which refers to the source of a data transmission providing a clock signal along with the transmitted data. The receiving device uses the transmitted clock to latch in the transmitted data. As noted above, bus 110 is capable of implementing either or both of these clocking schemes.

Figure 2:
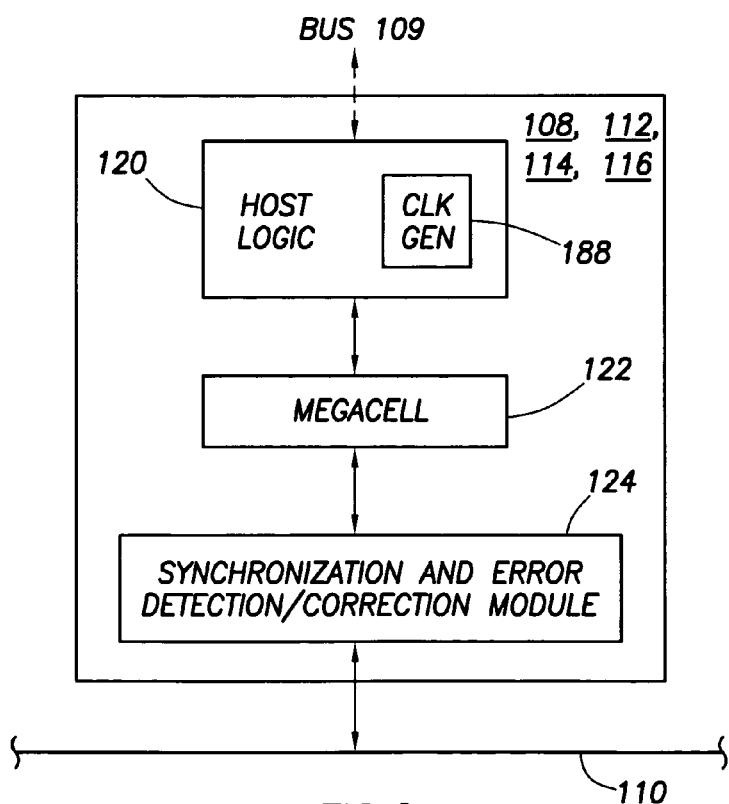
FIG. 2 shows a block diagram of a bus device of the system of FIG. 1.

FIG. 2 shows an exemplary block diagram of a bus device (e.g., bridge 108, an add-in card in a slot 112, NIC 114, and storage device 116) coupled to bus 110. Each device may comprise host logic 120 that is application specific to the function performed by the device, as well as a "megacell" 122 and a synchronization and error detection/correction module 124. If the device depicted in FIG. 2 represents the bridge 108, then the host logic 120 provides an interface to bus 109. The host logic 120 may include a clock generation circuit 188 that generates a clock used internally by the bus device.

The megacell 122 comprises a circuit that comports with the protocol of bus 110. If bus 110 complies with the PCI-X 2.0 protocol, for example, then megacell 122 is PCI-X 2.0 specific. The megacell 122 performs any one of variety of functions specific to the bus 110 such as arbitration and assertion and monitoring of various bus 110 specific control signals. The megacell 122 thus permits the host logic 120 to be designed without regard to the protocol implemented by the bus 110.

The synchronization and error detection/correction module 124 provides an interface between the megacell 122 and the bus 110. In general, the module 124 synchronizes source synchronous data received via the bus 110 to a dock signal generated and/or used internally to the bus devices 108, 112, 114, 116. Thus, the synchronization and error detection/correction module 124 provides synchronized data to the megacell 122. To comply with the applicable bus protocol (e.g., PCI-X 2.0), a finite amount of lime is allocated for the synchronization and error detection/correction module to synchronize the data. The synchronization and error detection/correction module 124 also may receive common dock data which does not require synchronization.

The module 124 provides one or more types of error detection. One type of error detection is referred to as "parity" which permits the applicable logic to detect a bit error in a received data packet, but does not permit the error to be corrected. A parity bit may be added to each data packet by which a determination can be made if any of the data bits were received in error, but not which bit was received erroneously. Another type of error detection involves the use of error correction code ("ECC") bits. One or more ECC bits can be computed for a given data packet and appended to the data packet for transmission to a receiving device. ECC logic in the receiving device recomputes the expected value of the ECC bits based on the data received and compares the expected value to the value of the ECC actually received. A match indicates the lack of an error; otherwise, a determination is made that an error has occurred. With ECC bits, not only can bit errors be detected, but also, in some situations, such errors can be corrected. For example, with ECC single bit errors can be detected and corrected, but multi-bit errors can only be detected, not corrected. As is provided for by the PCI-X 2.0 protocol, ECC bits are transmitted generally concurrently with source synchronous data. However, in the case of common clocked data, ECC bits are transmitted after the data (e.g., one clock cycle after the data the ECC bits are encoded to protect).

The synchronization and error detection/correction module 124 is capable of receiving source synchronous data or common clocked data via bus 110. The module 124 comprises error detection and correction logic that, for source synchronous data, detects an error and, if possible, corrects the error. As will be explained below, the error detection and correction logic of the synchronization and error detection/correction module detects and, if possible, corrects source synchronous data in the time allocated for synchronization and before providing synchronized data to the megacell 122. For common clocked data, the error detection and correction logic of the synchronization and error detection/correction module 124 detects errors, but may not correct such errors. In this latter case (common clocked data), the synchronization and error detection/correction module's error detection and detection logic computes the expected ECC bits and forwards the data and the computed expected ECC bits to the megacell 122. In response, the megacell corrects any bit errors based on the computed expected ECC bits received from the synchronization and error detection/correction module 124. The functionality performed by the synchronization and error detection/correction module 124 is described in greater detail below with regard to FIG. 3.

Figure 3:
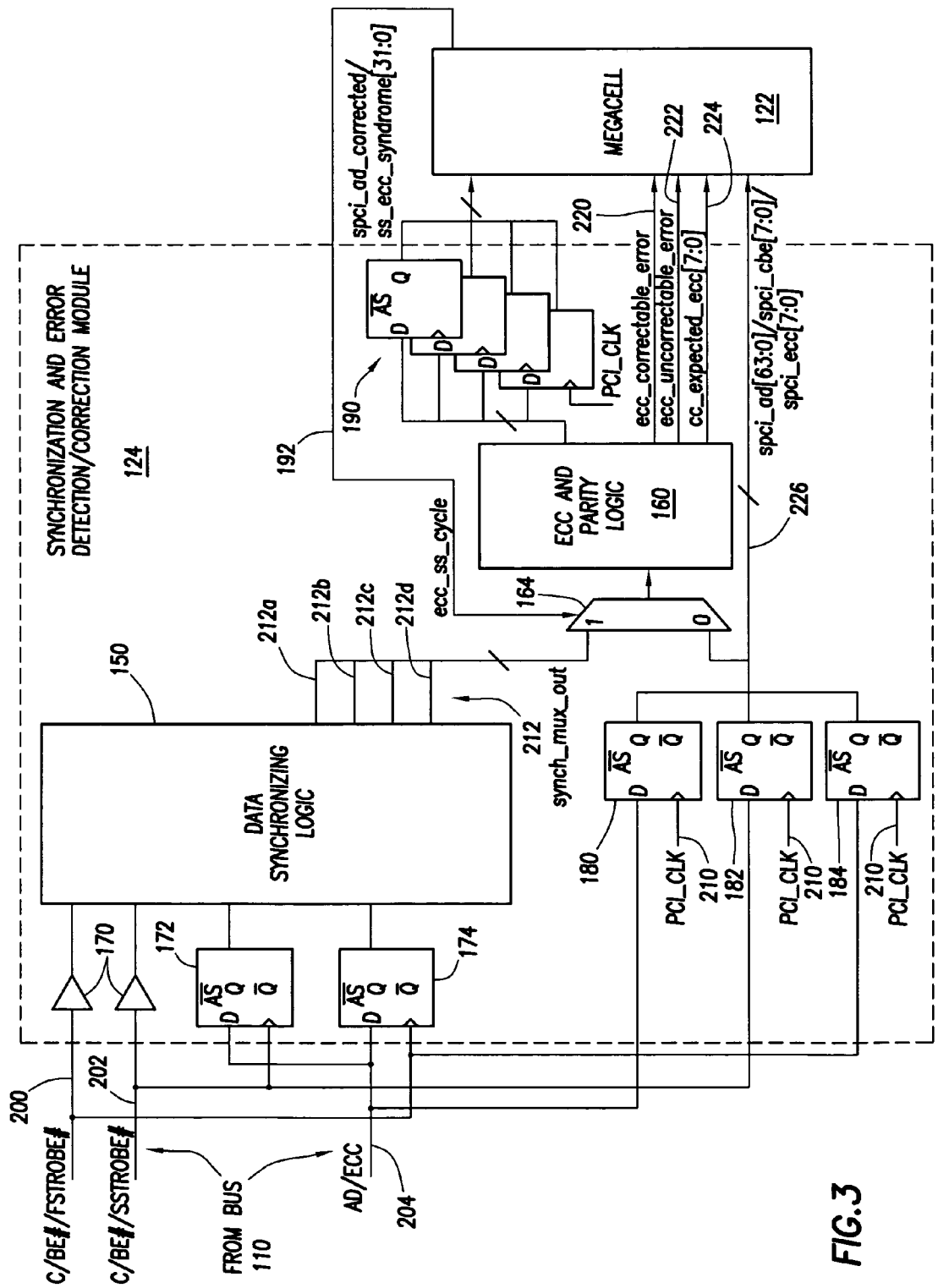
FIG. 3 shows a block diagram of a synchronization and error detection/correction module included in the bus device of FIG. 2.

In FIG. 3 the synchronization and error detection/correction module 124 of the bus device is shown coupled to the megacell 122. The module 124 generally comprises data synchronizing logic 150, ECC and parity logic 160 and a selection device 164 (e.g., a multiplexer). The ECC and parity logic 160 represents the synchronization and error detection/correction module's error detection and correction logic referred to above. The synchronization and error detection/correction module 124 also may comprise one or more latches 172, 180, 182, 184, and 190 as well as receivers 170. The clock signal produced by the clock generation circuit 188 may have a frequency and phase that is the same as, or different from, clocks used in the system 100 external to the bus device. In general, the clock signals that are provided on bus 110 when transmitting source synchronous data may differ in frequency and/or phase from the clock signal produced by clock generation circuit 188. In some embodiments, the frequency of the clock signal produced by the clock generation circuit 188 may be one-fourth the frequency (and out of phase) with respect to the bus 110's source synchronous clocks.

As shown to the left side of FIG. 3, the bus 110 may comprise a pair of strobe signals 200 and 202 and address/data/ECC signals 204. Thus bus 110 may provide other signals as desired. The strobe signals 200 and 202 (shown as "C/BE#FSTROBE# and C/BE#SSTROBE# in FIG. 3) represent the clock signals used by bus 110 when implementing source synchronous data transfers. When common clock data transfers are implemented on bus 110, synchronization and error detection/correction module 124 uses the common clock signals labeled as "pci_clk" signal 210. The pci_clk signal 210 may be generated external to the synchronization and error detection/correction module 124 and even external to the bus device containing the synchronization and error detection/correction module 124.

In some embodiments, as mentioned above, the strobe signals 200 and 202 may have a frequency that is two times the frequency of the clock signal produced by the bus device's clock generation circuit 188. The data synchronizing logic 150 functions to receive the AD/ECC data from signals 204 via latches 172, 174 (which are clocked by the faster strobe signals 200, 202) and synchronize such data to the slower internal clock of the bus device. Because in some embodiments each strobe signal is two times as fast as the bus device's internal clock signal and because two strobes may be provided, the output bus 212 from the data synchronizing logic 150 is four times as wide as external bus 110. For example, if the AD/ECC signals comprise a 64-bit wide data path, then bus 212 is 64 times 4, or 256, bits wide. This difference in bus width permits the data synchronizing logic 150 of the bus device to receive source synchronous data at a faster rate than the internal clock of the bus device and convert the timing associated with the data to a slower rate commensurate with the internal clock frequency of the bus device. By way of example, the data synchronizing logic 150 may receive four units of 64-bit wide data on bus 110 via four cycles of the strobes that are transmitted with the data. The data synchronizing logic 150 may receive the first 64-bit wide data unit from bus 110 and places such data unit onto the first 64-bit segment 212a of internal bus 212. Similarly, the second through fourth units of 64-bit data received via bus 110 in the subsequent three cycles of strobes clock 200, 202 are placed onto the second through fourth segments 212b, 212c and 212d of bus 212.

In some situations, however, common clock data transfers are implemented on bus 110. In these situations, the data transmitted via bus 110 bypasses the data synchronizing logic 150 (which is not needed for common clock data transfers) and is acquired by latches 180, 182, and 184.

The ECC and parity logic 160 may be enabled or disabled as desired. If enabled, source synchronous data is provided to the ECC and parity logic 160 via selection device 164. Similarly, if the ECC and parity logic 160 is enabled, any common clock transmitted data is provided to the ECC and parity logic 160 via selection device 164. As shown in FIG. 3, source synchronized data from bus 212 is provided to the "1" input of the selection device 164 and common clock data is provided to the "0" input. The megacell 122 asserts a control 192 (designated as "ecc_ss_cycle") which determines which set of input signals (1 or 0) is provided as an output of the selection device 164 to the ECC and parity logic 160. The megacell 122 may determine how to assert the control signal 192 (whether to cause source synchronized or common clock data to be provided to ECC and parity logic 160) based on a previously received and decoded address/attribute phase. That is, attribute signals may be provided to the bus device in advance of a data phase and the attribute signals may be examined by the megacell 122 to determine the type of clocking scheme to be used during the data phase.

The logic implemented by the ECC and parity logic 160 may comprise parity logic and ECC logic. For those bus 110 transactions for which parity is enabled, the ECC and parity logic 160 provides a parity function to determine if a bit was received in error. For those bus 110 transactions for which ECC is enabled, the ECC and parity logic 160 provides an ECC function to determine if a bit was received in error and, if so, correct the bit if possible.

For source synchronous data transactions and as mentioned above, a finite amount of time is allocated for the synchronization process to occur per the applicable protocol implemented on bus 110. In accordance with exemplary embodiments of the invention, for source synchronous data transactions, the ECC-based error detection and correction (to the extent correctable errors have occurred) occurs during the time period allocated for synchronization. As such, error detection and correction occurs "concurrently" with the data synchronization. In this context and as used in the claims, concurrent does not require the error detection/correction and data synchronization processes to occur simultaneously. Concurrent means that in the time allocated for synchronization, both synchronization and error detection and correction occur. In some embodiments, however, both synchronization and error detection and correction may occur simultaneously. Because ECC error detection and correction occurs concurrently with the data reception and synchronization function performed by the data synchronizing logic 150, latency is reduced relative to what would have been the case if the error detection and correction function occurred after the complete reception and synchronization of all data from bus 110. Thus, by incorporating error detection and correction logic into the synchronization and error detection/correction module 124, overall performance is improved compared to what would likely be the case if error detection and correction were the sole responsibility of the megacell 122. Performing error detection and correction concurrently with synchronization is facilitated by the PCI-X 2.0 protocol, to the extent this protocol is implemented on bus 110, because per the PCI-X 2.0 protocol, ECC bits are transmitted with the associated date and address bits.

For source synchronous data transactions, the synchronization and error detection/correction module 124 thus provides error corrected data to the megacell 122. If a correctable error occurred (and thus was corrected by the synchronization and error detection/correction module), the synchronization and error detection/correction module asserts the status signal 220 "ecc_correctable_error" to the megacell. If an uncorrectable error occurred, the module 124 asserts the "ecc_uncorrectable_error" status signal 222. Status signals 220, 222 permit the megacell 122 or host logic 120 to log errors so that a user can take corrective action (e.g., replace a component) if, for example, a high error rate is observed.

In the case of common clocked data in which ECC bits are transmitted following the transmission of the relevant data bits, the error detection and correction logic 160 of the synchronization and error detection/correction module 124 receives such data via the "0" input of the selection device 164 and under control of the megacell 122 as explained above. In the common clocked data case, the error detection and correction logic 160 computes expected ECC bits, but does not correct errors due to timing constraints imposed by the PCI-X 2.0 specification. The ECC and parity logic 160 provides the computed expected ECC bits to the megacell via "cc_expected_ecc[7:0] signals 224. Additionally, the received ECC bits from bus 110 are provided to the megacell as bits "spci_ecc[7:0] on signals 226. Provided with the expected and received ECC bits, the megacell 122 compares the expected ECC bits computed by the synchronization and error detection/correction module 124 to the ECC bits received over the bus 110. The megacell 122 thus can detect and correct any bit errors and provide verified data to the bus device's host logic 120.

The latches 190 hold the synchronized data after processing by the hard macro 124. This data has been synchronized to the common clock frequency internal to bus device. The data also has been checked for ECC/parity errors by ECC and parity logic 160. The data is then transmitted to megacell 122 for further processing by the bus device.

Figure 4:
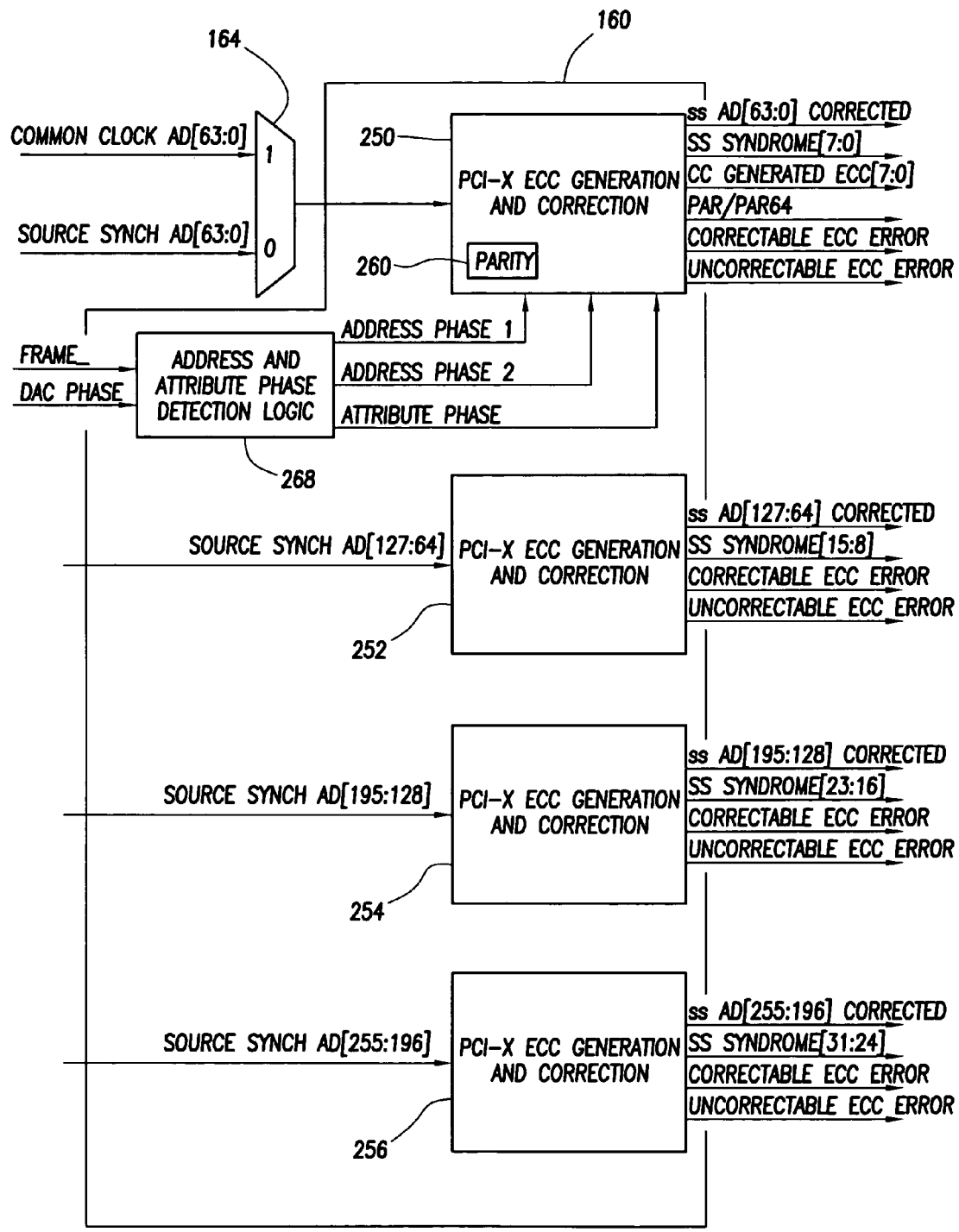
FIG. 4 shows a block diagram of error detection and correction logic in the synchronization and error detection/correction module of FIG. 3.

FIG. 4 shows an exemplary embodiment of the ECC and parity logic 160 of FIG. 3. As shown, the ECC and parity 160 may comprise separate ECC generation and correction logic units 250, 252, 254, and 256 for each set of bits received from bus 110. The ECC generation and correction logic unit 250–256 are largely identical to one another and implement a suitable ECC algorithm. ECC generation and correction logic 250 also includes parity logic 260 that may not be included in the other ECC generation and correction logic units 252–256. As such, ECC generation and correction logic unit 250 performs parity checking for parity enabled data transfers.

An address and attribute phase detection logic 268 also is provided. The address and attribute phase logic 268 provides information as to the phase of the transaction that is currently in progress. This information is used by the PCI-X ECC generation and correction block 250 to properly generate the expected ECC for the incoming data from multiplexer 164.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A bus device adapted to be coupled to a bus, comprising:
   a clock generator that is adapted to generate a clock signal for internal use by the bus device;
   data synchronizing logic that is adapted to synchronize source synchronous data that the bus device receives from the bus to the bus device's clock signal; and
   error detection and correction logic coupled to the data synchronizing logic, the error detection and correction logic is adapted to detect and correct errors associated with the data received from the bus concurrently while the data synchronizing logic synchronizes source synchronous data received from the bus to the clock signal.

2. The bus device of claim 1 further comprising a selection device coupled to the data synchronizing logic, the bus, and the error detection and correction logic, wherein the selection device selectively provides to the error detection and correction logic synchronized data from the data synchronizing logic or common clocked data from the bus that has not been synchronized by the data synchronizing logic.

3. The bus device of claim 1 further comprising a megacell coupled to the bus and to the error detection and correction logic, wherein said megacell arbitrates for control of the bus and receives corrected data from the error detection and correction logic.

4. The bus device of claim 3 wherein the error detection and correction logic computes expected error correction code bits for common clocked data and provides the computed expected error correction code bits to the megacell for correction of bit errors, if any.

5. The bus device of claim 3 further comprising a multiplexer coupled to the data synchronizing logic, the bus, and the error detection and correction logic, wherein the multiplexer provides either synchronized data from the data synchronizing logic or common clock data from the bus to the error detection and correction logic as dictated by a control signal from the megacell.

6. Thus bus device of claim 1 wherein data synchronizing logic receives a plurality of source synchronous data units from the bus, each data unit received in a separate cycle of a clock transmitted with each source synchronous data unit, and each data unit is provided to the error detection and correction logic which detects errors in each data unit while the data synchronizing logic receives and synchronizes a subsequent source synchronous data unit.

7. A system comprising:
   a plurality of devices;
   a bus coupling together the plurality of devices, wherein source synchronous and common clocked data transactions can occur over the bus between the devices;
   wherein each device comprises a megacell coupled to a synchronization and error detection/correction module, the megacell implementing a protocol associated with the bus and the synchronization and error detection/correction module synchronizing source synchronous data while concurrently detecting errors with such source synchronous data.

8. The system of claim 7 wherein each device comprises a clock generator that is adapted to generate a clock signal for internal use by the device and each synchronization and error detection/correction module comprises:
   data synchronizing logic that is adapted to synchronize source synchronous data that the device receives from the bus to the bus device's clock signal; and
   error detection and correction logic coupled to the data synchronizing logic, the error detection and correction logic is adapted to detect and correct errors associated with the data received from the bus concurrently while the data synchronizing logic synchronizes source synchronous data received from the bus to the clock signal.

9. The system of claim 7 wherein a device receives a plurality of source synchronous data packets and detects an error in each data packet while receiving and synchronizing a subsequent data packet.

10. The system of claim 7 wherein each synchronization and error detection/correction module receives source synchronous data and common clocked data and the synchronization and error detection/correction module detects and corrects errors for source synchronous data before providing such data to the megacell, but generates expected ECC bits for common clocked data without correcting errors associated with said common clocked data.

11. A bus device adapted to be coupled to a bus, comprising:
   a clock generator that is adapted to generate an clock signal for internal use by the bus device; and
   means for receiving source synchronous data from the bus and for synchronizing the source synchronous data to the clock while simultaneously detecting errors associated with the source synchronous data.

12. The bus device of claim 11 further comprising means for detecting and correcting errors associated with the source synchronous data simultaneously while synchronizing the source synchronous data.

13. The bus device of claim 11 further comprising means for receiving common clocked data and for detecting and correcting errors associated with the source synchronous data and for generating ECC bits without correcting errors associated with common clocked data.

14. A bus device adapted to be coupled to a bus, comprising:
   a clock generator that is adapted to generate a clock signal for internal use by the bus device;
   data synchronizing logic that is adapted to synchronize source synchronous data that the bus device receives from the bus to the bus device's clock signal; and
   error detection and correction logic coupled to the data synchronizing logic, the error detection and correction logic is adapted to detect and correct errors associated with the data received from the bus within a time period allocated to the data synchronizing logic to synchronize source synchronous data.

15. The bus device of claim 14 wherein the error detection and correction logic comprises a plurality of ECC generation and correction logic units and at least one, but not all, of the ECC generation and correction logic units also comprises parity logic.

16. The bus device of claim 15 wherein only one of the ECC generation and correction logic units comprises parity logic.

17. A method usable in a device having an internal clock and capable of receiving an external clock, the internal clock having a frequency that is different from that of the external clock, the method comprising:
receiving a plurality of source synchronous data portions in separate cycles of the external clock; and
synchronizing the received data portions to the internal clock while concurrently detecting and correcting errors in the received data portions.

18. The method of claim 17 further comprising correcting errors in the received data portions concurrently with receiving a data portion and making the timing associated with the data portion comport with the timing of the internal clock.

19. The method of claim 17 further receiving a common clocked data, detecting and correcting errors of source synchronous data, and detecting, but not correcting, errors of common clocked data.

* * * * *

UNITED STATES PATENT AND TRADEMARK OFFICE
CERTIFICATE OF CORRECTION

PATENT NO.         : 7,139,965 B2                                          Page 1 of 1
APPLICATION NO.    : 10/680884
DATED              : November 21, 2006
INVENTOR(S)        : Paras A. Shah et al.

It is certified that error appears in the above-identified patent and that said Letters Patent is hereby corrected as shown below:

In column 3, line 27, delete "dock" and insert -- clock --, therefor.

In column 3, line 32, delete "lime" and insert -- time --, therefor.

In column 3, line 35, delete "dock" and insert -- clock --, therefor.

In column 6, line 13, delete "date" and insert -- data --, therefor.

Signed and Sealed this

Seventh Day of July, 2009

JOHN DOLL
*Acting Director of the United States Patent and Trademark Office*